US008774987B2

(12) United States Patent
Walton et al.

(10) Patent No.: US 8,774,987 B2
(45) Date of Patent: Jul. 8, 2014

(54) VERTICAL GUST SUPPRESSION SYSTEM FOR TRANSPORT AIRCRAFT

(75) Inventors: Vincent M. Walton, Federal Way, WA (US); Christopher J. Borland, Bellevue, WA (US); Tze L. Siu, Seattle, WA (US); Kioumars Najmabadi, Clyde Hill, WA (US); Edward E. Coleman, Lake Forest Park, WA (US); David P. Marquis, Mukilteo, WA (US); Dianne L. McMullin, Bothell, WA (US); Kevin H. Milligan, Renton, WA (US)

(73) Assignee: The Boeing Company, Chicago, IL (US)

( * ) Notice: Subject to any disclaimer, the term of this patent is extended or adjusted under 35 U.S.C. 154(b) by 1299 days.

(21) Appl. No.: 11/958,248

(22) Filed: Dec. 17, 2007

(65) Prior Publication Data

US 2009/0157239 A1 Jun. 18, 2009

(51) Int. Cl.
G05D 1/00 (2006.01)

(52) U.S. Cl.
USPC .................. 701/10; 244/76 C; 701/4; 701/8; 701/11

(58) Field of Classification Search
USPC ............... 244/76 C, 174, 181, 182, 183, 195; 701/4, 6, 10, 8, 11
See application file for complete search history.

(56) References Cited

U.S. PATENT DOCUMENTS 2,962,243 A 11/1960 Coleman
3,814,912 A * 6/1974 Manke et al. ............ 701/6
5,186,416 A * 2/1993 Fabre et al. .............. 244/191
5,375,794 A * 12/1994 Bleeg ....................... 244/76 C
5,457,630 A * 10/1995 Palmer ..................... 701/3
5,797,105 A * 8/1998 Nakaya et al. ............ 701/7
5,995,880 A * 11/1999 Larramendy et al. ..... 701/4
6,044,311 A * 3/2000 Larramendy et al. ..... 701/10
6,161,801 A 12/2000 Kelm et al.

(Continued)

FOREIGN PATENT DOCUMENTS

DE 19841632 A1 3/2000
DE 102004029194 A1 1/2006

(Continued)

OTHER PUBLICATIONS

James Wallace; "Aerospace Notebook: Lightning a weighty issue for the 787"; Jul. 12, 2006; Seattle Post—Intelligencer.*

(Continued)

Primary Examiner — Stephen Holwerda
(74) Attorney, Agent, or Firm — The Small Patent Law Group; Dean D. Small

(57) ABSTRACT

A method for vertical gust suppression due to turbulence for an aircraft having at least one of direct lift control surfaces or pitch control surfaces. The method includes sensing atmospheric turbulence, measuring the sensed atmospheric turbulence to generate turbulence data, generating a command based on the turbulence data, and applying the command to aircraft controls to actuate the direct lift control surfaces or the pitch control surfaces based on the turbulence data. Therefore, an aircraft response to the actuation of the direct lift control surfaces or the pitch control surfaces reduces a vertical acceleration, a pitch acceleration, a pitch rate, a pitch attitude or a structural load of the aircraft due to the turbulence. Thus, the method reduces the effects of vertical gusts of wind on the aircraft, improves the comfort level for aircraft passengers and crew, and reduces diversions the aircraft may take to avoid the turbulence.

26 Claims, 4 Drawing Sheets

(56) References Cited

U.S. PATENT DOCUMENTS

| | | | |
|---|---|---|---|
| 6,253,126 B1* | 6/2001 | Palmer | 701/14 |
| 6,273,370 B1* | 8/2001 | Colgren | 244/181 |
| 7,499,181 B2* | 3/2009 | Mirand et al. | 356/519 |
| 2003/0205644 A1* | 11/2003 | Najmabadi et al. | 244/195 |
| 2005/0090947 A1* | 4/2005 | Wise | 701/6 |

FOREIGN PATENT DOCUMENTS

| | | |
|---|---|---|
| DE | 102006003199 B3 | 8/2007 |
| EP | 1854717 A1 | 11/2007 |
| GB | 723529 A | 2/1955 |
| WO | WO 2006016075 A1 * | 2/2006 |
| WO | WO2007005045 A2 | 1/2007 |

OTHER PUBLICATIONS

Susan Stellin; "The Inevitability of Bumps"; Jun. 12, 2007; New York Times.*

Hahn, "Lars—Auslegung und Erprobung Eines Fortschrittlichen Boenabminderungenssystems Mit Attas", Deutscher Lufe—Und Raumfahrtkongress, XX, XX, Jan. 1, 1991, ppl. 950-961, p. 950, col. 1, line 1-p. 954, col. 2, line 38.

* cited by examiner

VERTICAL GUST SUPPRESSION SYSTEM FOR TRANSPORT AIRCRAFT

FIELD OF THE INVENTION

The field of the present disclosure relates to mechanical suppression of atmospheric phenomenon for aerospace, and more specifically, to systems and methods for suppressing the effects of vertical gusts of wind on a transport aircraft.

BACKGROUND

Atmospheric turbulence is a problem that is commonly encountered by aircraft. Atmospheric turbulence typically refers to localized wind variations, i.e., rapid differences in wind speed and/or direction from an average or a mean flow of air. For example, atmospheric turbulence may include but is not limited to, wind shear, wind gradients, clear-air turbulence, wake turbulence, "air pockets", and the like. Furthermore, atmospheric turbulence may be broken down into two components, vertical and horizontal wind shears or gusts of wind. Vertical shear or gusts of wind typically occur at higher levels in the atmosphere and above or near a vertical surface, such as a mountain. Horizontal shear may occur near weather fronts or near a coastal region. For example, aircraft pilots may consider a vertical speed change that is greater than 152 meters/500 feet per minute or a horizontal change in airspeed of 30 knots/15 m/s to be significant wind shear. Thus, pilots try to avoid flying in turbulent conditions, such as the significant wind shear conditions as described, whenever possible.

There may be different factors causing atmospheric turbulence. In some cases, the turbulence may be caused by erratic movement of air masses in the absence of any clouds; mixture of warm and cold air in the atmosphere, movement of winds in different directions or near the edges or intersections of a jetstream. Turbulence may also occur in the vicinity of, but outside of thunderstorms. Along with these factors, atmospheric turbulence is typically difficult to detect with the naked eye or with conventional radar (unless moisture is present). As a result, turbulence may create hazards for air navigation.

Due to the difficulties in detecting and avoiding turbulence, there may be times when the pilots are flying the aircraft into turbulent conditions without notice. If this situation occurs, the turbulent conditions may cause motion sickness and/or anxiety for passengers and flight crew, and may reduce ride quality and/or comfort for passengers. Therefore, it is desirable to find ways to keep the aircraft flight as smooth as possible.

SUMMARY

One or more embodiments of the present invention describe methods and systems for reducing transport aircraft response to turbulence. Embodiments of the present invention advantageously provide ways for an aircraft to navigate in turbulence, whenever turbulence is encountered. Also, embodiments of the present invention provide ways to reduce the effects of turbulence on the aircraft.

In view of the above, this disclosure describes various exemplary systems, methods, and computer-readable media products for suppressing motions caused by vertical gusts of wind for an aircraft. As used herein, the term exemplary refers to an example and not necessarily an ideal. The suppression occurs by sending signals to the flight control surfaces to reduce the aircraft response to turbulence conditions.

In one embodiment, a method for vertical gust suppression due to turbulence for an aircraft having at least one of direct lift control surfaces or pitch control surfaces actuated by aircraft controls. The method includes sensing turbulence, measuring the sensed turbulence to generate turbulence data, generating a command based on the turbulence data, applying the command to the aircraft controls to actuate at least one of direct lift control surfaces or pitch control surfaces based on the turbulence data. Furthermore, an aircraft response to the actions of the direct lift control surfaces or the pitch control surfaces reduces a vertical acceleration, a pitch upset, a pitch acceleration, a pitch rate, a pitch attitude, or a structural load of the aircraft due to the turbulence. Thus, the method reduces gust loads on an aircraft, improves comfort levels for aircraft passengers, and reduces diversions that the aircraft may take to avoid the turbulence.

In another embodiment, a system includes one or more sensors to monitor turbulence, a gust estimator in operation with the sensors to measure turbulence, and filters in operation with the gust estimator to generate a command to the aircraft flight controls. In response to the command and the aircraft flight controls, at least one of the direct lift control surfaces or the pitch control surfaces actuate to reduce a vertical acceleration, a pitch upset, a pitch acceleration, a pitch rate, a pitch attitude or a structural load of the aircraft due to the turbulence. Therefore, the system improves the ride quality for passengers and crew of the aircraft and reduces the amount of lost work time from injuries suffered during turbulence events.

In another embodiment, a computer-readable storage media includes computer-program instructions that are executable by a flight control computer, the instructions are configured to cause the flight control computer to perform operations such as sensing turbulence, measuring the sensed turbulence to generate turbulence data, generating a command based on the turbulence data, applying the command to aircraft controls to actuate at least one of direct lift control surfaces or pitch control surfaces based on the turbulence data. Furthermore, an aircraft response to the actions of the direct lift control surfaces or the pitch control surfaces reduces a vertical acceleration, a pitch upset, a pitch acceleration, a pitch rate, a pitch attitude, or a structural load of the aircraft due to the turbulence. Also, the computing instructions will cause operations to shut down if at least one representation occurs, a sensor fails, a command fails, or control signal is invalid. Thus, vertical gust suppression offers the advantage of a fail-safe feature.

The features, functions, and advantages that have discussed above or will be discussed below can be achieved independently in various embodiments, or may be combined in yet other embodiments, further details of which can be seen with reference to the following description and drawings.

BRIEF DESCRIPTION OF THE DRAWINGS

Embodiments of systems and methods in accordance with the teachings of the present disclosure are described in detail below with reference to the following drawings.

DETAILED DESCRIPTION

Overview

The present disclosure teaches methods and systems for vertical gust suppression, and is shown and described in the context of reducing an aircraft response to turbulence by using air data, inertial motion sensors, control laws, and control effectors. This disclosure describes suppressing the effects of vertical gusts of wind by sensing turbulence, measuring the sensed turbulence to generate turbulence data, generating a command based on the turbulence data, applying the command to aircraft controls to actuate at least one of direct lift control surfaces or pitch control surfaces based on the turbulence data. The actuation from the direct lift control surfaces and the pitch control surfaces reduces the vertical acceleration, a pitch upset, a pitch acceleration, a pitch rate, a pitch attitude, or a structural load of the aircraft due to the turbulence. Thus, this reduction improves ride quality for passengers and flight crew on the aircraft.

In one embodiment, the sensing and measuring of turbulence includes sensor signals to form an estimate of the turbulence, such as vertical gusts of wind, reaching a nose of the aircraft. The combination of air data and inertial sensors may measure factors or parameters, including but not limited to, vertical speed, true air speed, pitch rate, pitch attitude, roll attitude, and sideslip angle. If there is turbulence, a command may be generated and sent to the aircraft controls to actuate the flaperons to modify the aircraft lift in response to the vertical gust data. Furthermore, an additional signal may be sent to the elevator of the aircraft to cancel out any additional pitching response that may be induced by the flaperons. Therefore, the process reduces incidents of motion sickness for passengers and crew of the aircraft.

In another embodiment, the sensing and measuring of turbulence includes an Ultraviolet Light Detection And Ranging (UV LIDAR) system to measure atmospheric motion ahead of the aircraft. This process offers advantages of additional control lead time. Furthermore, separate commands to the aircraft controls actuate direct lift control surfaces or pitch control surfaces to reduce a vertical acceleration, a pitch upset, a pitch acceleration, a pitch rate, a pitch attitude, or a structural load of the aircraft due to the turbulence. Thus, these modifications improve safety for passengers and crew and reduce structural loads on the aircrafts.

Many specific details of certain embodiments of the invention are set forth in the following description and in FIGS. 1-4 to provide a thorough understanding of such embodiments. One skilled in the art will understand, however, that the invention may have additional embodiments, or that the invention may be practiced without several of the details described in the following description.

Figure 1:
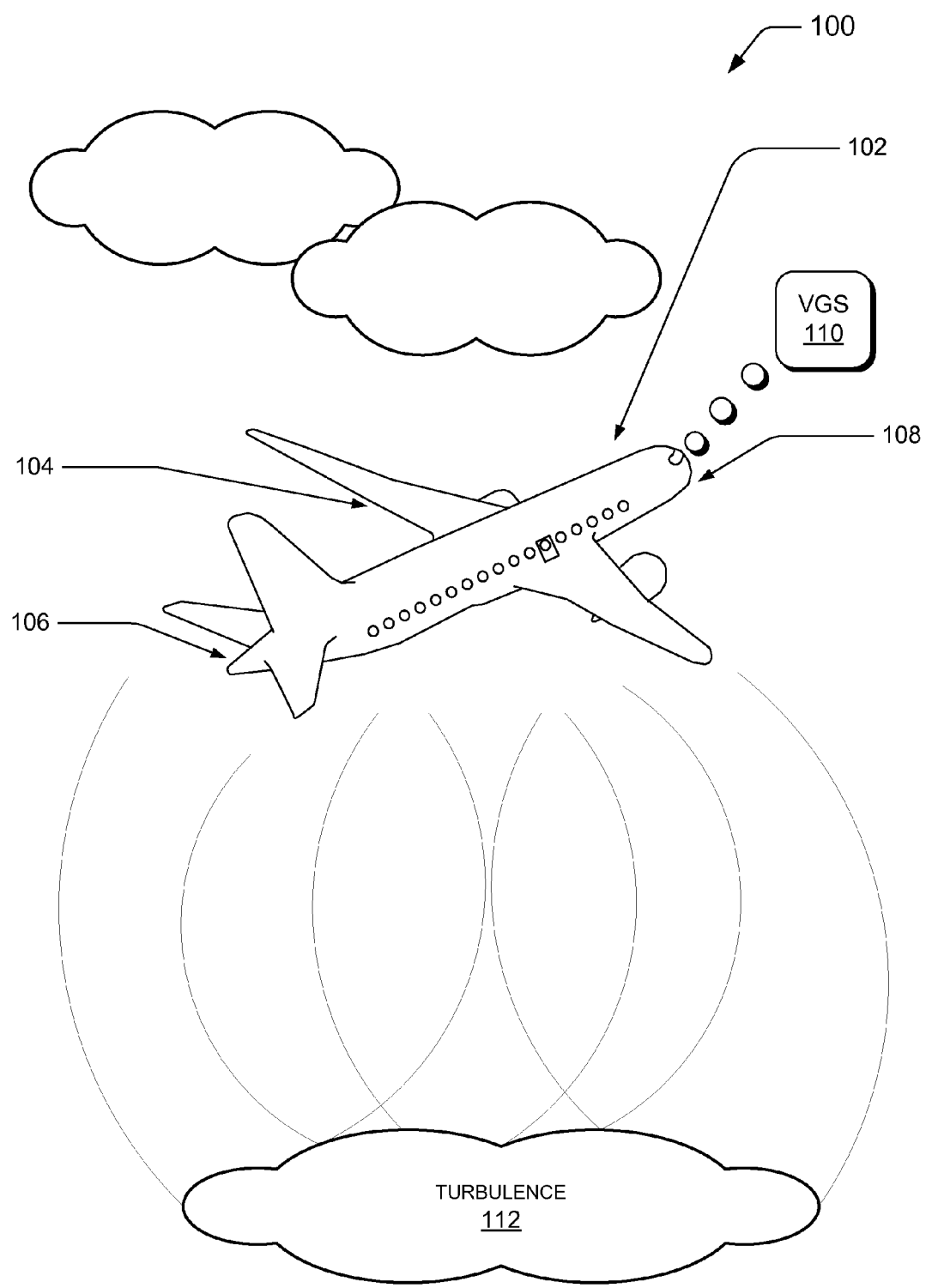
FIG. 1 illustrates an exemplary vertical gust suppression system in accordance with an embodiment of the invention.

FIG. 1 illustrates an overview of a vertical gust suppression (VGS) system 100 in accordance with one embodiment of the present invention. An aircraft 102 is shown with VGS. The term aircraft 102 may be used interchangeably with transport aircraft, airflight, airplane, plane, and the like.

The aircraft 102 may include control surfaces such as, but is not limited to, the flaperons or ailerons 104, an elevator 106, a canard 108, and the like. The direct lift control surfaces, the flaperons of ailerons 104, may be hinged control surfaces attached to a trailing edge of a wing of a fixed-wing aircraft. The flaperons or ailerons 104 may control a roll or bank (degree of rotation about a longitudinal axis) of the aircraft 102. In some aspects, the flaperons 104 on each wing are lowered together to function much the same way as a dedicated set of flaps. In other aspects, the ailerons 104 on each wing are actuated differently, one aileron downward while the other aileron is upward to control roll of the aircraft 102.

The elevator 106 and the canard 108 are used to control a pitching motion of the aircraft 102, and are known as pitch control surfaces. The elevator 106 is located at a rear of the aircraft and helps control a vertical movement of the aircraft 102. There may be two elevators 106 where each is attached to each side of a fuselage. Furthermore, the elevator 106 controls a position of a nose of the aircraft 102 and angle of attack of a wing. The canard 108 is mounted at a front of the aircraft 102, which operates in a manner similar to the elevator 106.

In FIG. 1, the aircraft 102 includes the vertical gust suppression (VGS) system 110, which is an active aircraft control system to reduce the aircraft response to turbulence 112. The term turbulence may be interchangeably used with the phrase vertical gusts of wind. The active aircraft control system is part of the aircraft 102 control system and is readily available when turbulence 112 is encountered during a flight For example, weather forecasts may be inaccurate, existing warning from radar may not detect turbulence unless moisture is present, and avoidance may not be timely or possible, causing the aircraft 102 to fly into turbulence 112.

Sensing turbulence 112, the VGS 110 may operate cooperatively with many different devices. These devices sense and measure-turbulence, generate a command to the aircraft flight controls, and actuate the direct lift control surfaces and the pitch control surfaces. Turbulence 112 may be illustrated as localized wind variations, such as a difference in wind speed and/or direction.

The vertical gust suppression (VGS) 110 described is not limited to any particular aircraft, but may be applied to many types of aircraft or flying mechanisms.

Vertical Gust Suppression Process

Figure 2:
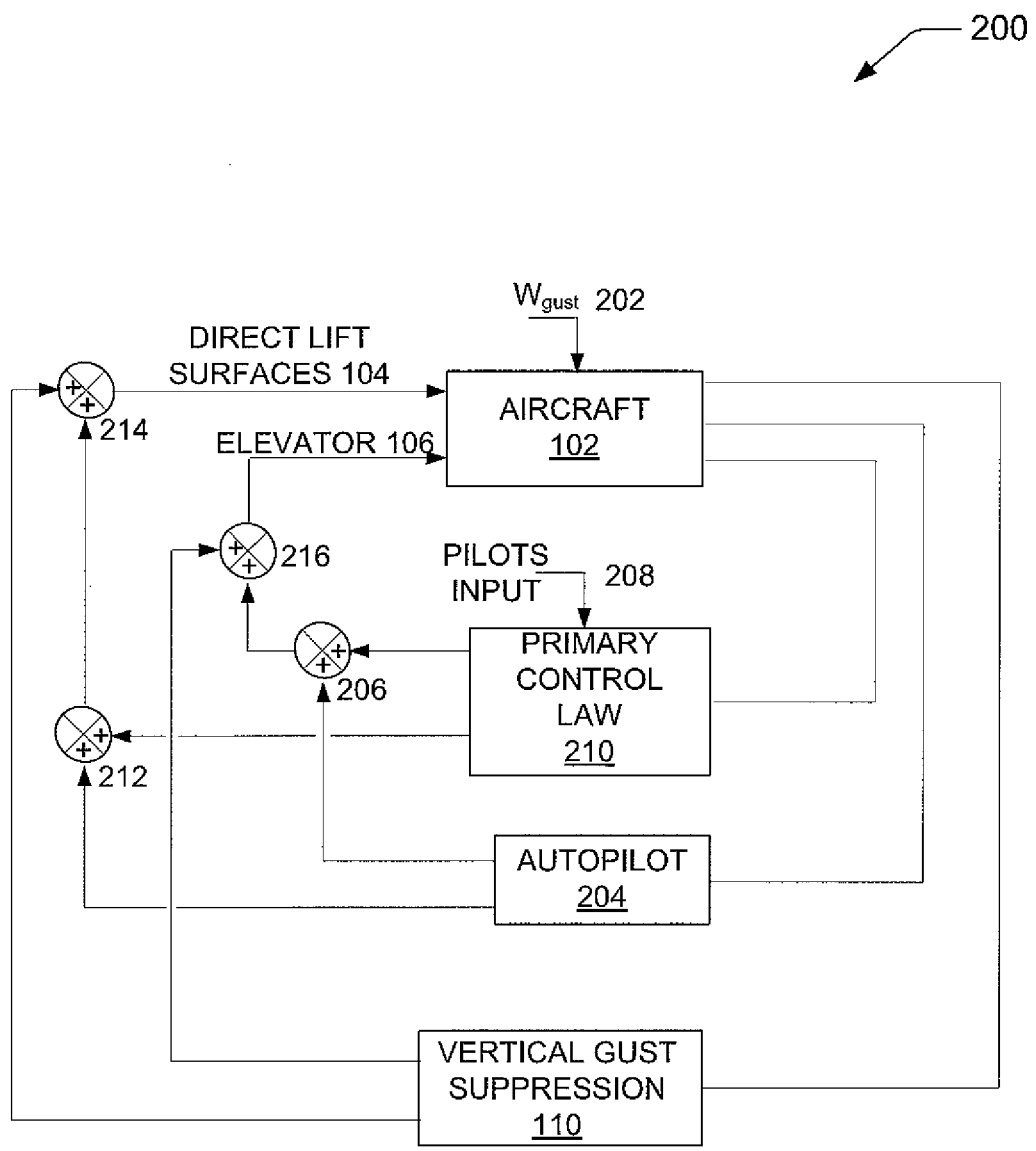
FIG. 2 illustrates a block diagram of the vertical gust suppression system shown in FIG. 1.

FIG. 2 illustrates a block diagram of the vertical gust suppression system 200 in accordance with the VGS 110 of FIG. 1. This disclosure describes a concept of feed-forward control, in combination with existing aircraft feedback control law which may include but is not limited to, stability augmentation and autopilot to reduce turbulence response. This approach provides advantages in that the feed-forward controller augments a baseline feedback control design.

Typically, pilots try to avoid areas of forecasted turbulence 112 when possible or request changes in altitude from Air Traffic Control. If turbulence is associated with clouds or storms, then radar may be available to warn the pilots of the turbulence 112. A drawback is that the forecasts may miss the specific areas of turbulence 112 that the aircraft 102 may take as part of the flight route. Requesting changes in altitude may take time to accomplish once approval is granted from Air Traffic Control. On the other hand, there may not be an area of turbulence-free altitude available for the aircraft 102. Since avoidance and/or forecasts may not be available or accurate, pilots may have no choice but to fly the aircraft 102 into turbulence 112.

Shown in FIG. 2 is an embodiment where the aircraft 102 encounters vertical gust, Wgust 202. The Wgust 202 creates hazardous conditions for air navigation. These vertical gusts of wind Wgust 202 cause the aircraft 102 to experience sudden unexpected accelerations as the aircraft 102 is flying into the Wgust 202.

In one embodiment, the process flows from the aircraft 102 to autopilot 204 to provide feedback control at node 206. Autopilot 204 occurs when the pilots may engage the aircraft 102 to cruise during the flight. However, when the aircraft 102 encounters Wgust 202, the aircraft 102 may experience an upward gust of turbulence which may cause the autopilot 204 to disengage. Shown are the signals from autopilot 204 at node 206.

In response to Wgust 202, the pilots provide input 208 to help stabilize the aircraft 102 based on primary control law 210. Here, primary control law 210 with the pilots input 208 provide controls at node 206 in combination with the controls from autopilot 204. In instances without VGS 110, a pilot may react to the vertical gust with a nose-down command, which may cause a high positive load factor on the aircraft 102.

Next, the process receives feed-forward from the vertical gust suppression system 110 along with the feedback control from the autopilot 204 and primary control law 210 at node 212 to define the control command to the direct lift surfaces at node 214. The control at node 214 provides signals to the direct lift surfaces 104. The direct lift control surfaces, the flaperons or ailerons 104 may control a roll or bank (degree of rotation about a longitudinal axis) of the aircraft 102. In some aspects, the flaperons 104 on each wing are lowered together to function much the same way as a dedicated set of flaps. Thus, the command at node 214 cause the direct lift control surfaces 104 to modify the aircraft 102 lift in response to the Wgust 202.

Depending on the Wgust 202, the design of the aircraft 102, and other factors, the process may use a canard 106, which tends to be located at a front of the aircraft 102 to provide at least some pitch control. The airflight controls actuate the pitch control surfaces according to the vertical gusts of wind.

In this embodiment, the process receives feed-forward controls from the vertical gust suppression system 110 along with the feedback control from the autopilot 204 and primary control law 210 at node 206. Here, the feedback controls from node 206 proceeds to define control at node 216. Control at node 216 provides controls to the pitch control surfaces, such as an elevator 106 to help provide pitch control primarily in the vertical direction and to stabilize the aircraft 102. The elevator 106 may cancel out any additional pitching response that may be induced by the flaperons or ailerons 104.

Components of the Vertical Gust Suppression System

Figure 3:
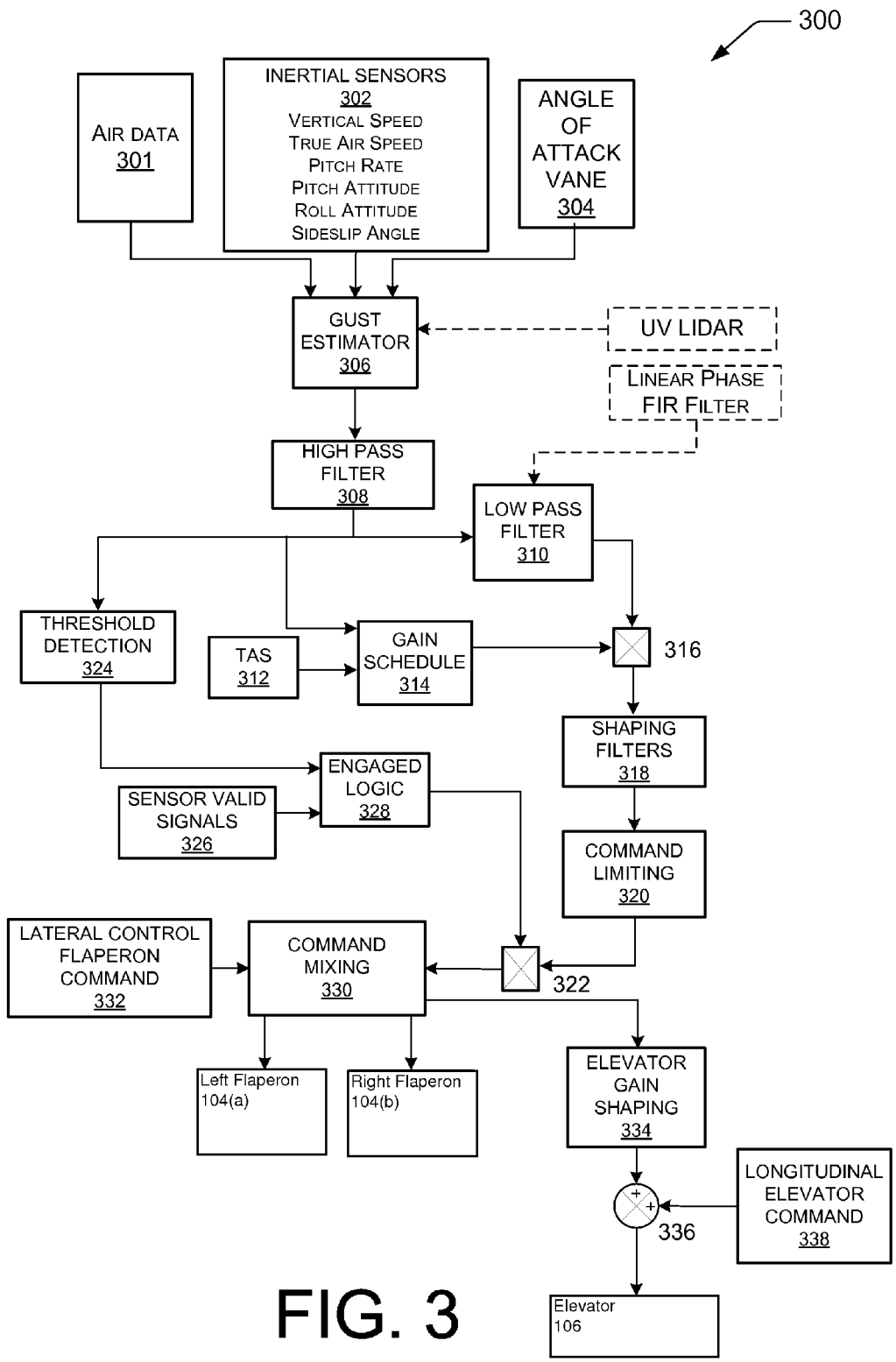
FIG. 3 illustrates a block diagram of the components of an embodiment of the vertical gust suppression system.

FIG. 3 illustrates a block diagram of the components of the vertical gust suppression system (VGS) 300 in accordance with the VGS 110 of FIG. 1. The block diagram 300 is shown as separate functional steps but should not be construed as necessarily order-dependent in performance. The order described is not a limitation and any number of the process steps may be combined to implement the method.

This embodiment is one example of the present invention. The method includes collecting air data (i.e., temperature, pressure, and velocity) shown as block 301 and sensing the motion of the aircraft with inertial sensors shown as block 302. The inertial sensors 302 senses and measures factors affecting turbulence data, including but are not limited to, vertical speed, true air speed, pitch rate, pitch attitude, roll attitude, and sideslip angle.

Block 304 shows an angle of attack vane. The angle of attack 304 is a measurement of the angle of the nose of the aircraft 102 with respect to a direction of movement of air surrounding the aircraft 102. There may be differences between the pitch angle and the direction of movement. Information collected by air data 301, the inertial sensors 302, and the angle of attack vane 304 proceed towards the gust estimator 306.

The gust estimator 306 estimates and/or measures the turbulence data by analyzing information collected from a combination of the air data 301, inertial sensors 302, and angle of attack 304, as described above. The combination of air data 301 and inertial sensors 302 determines an "inertial angle of attack," i.e. the angle of attack in the absence of motion of the air. The angle of attack vane 304 measures a total angle of attack. A difference between the two is the angle of attack induced by the vertical gust. This difference is used by the gust estimator 306 to identify a level of vertical gusts of wind.

Block 308 illustrates a high pass filter. The high pass filter 308 may allow signals with high frequencies to pass through the process. Here, the high pass filter 308 generates a command for longitudinal control laws that will be transmitted to the aircraft controls. Next, the process flows to the low pass filter 310 where signals with low frequencies may pass through the process.

Turning to true air speed (TAS) block 312, the process measures the speed of the aircraft 102 with respect to the air surrounding the aircraft. The TAS is used to adjust the gain of the VGS 110 in addition to scaling the measured gust angle to identify the vertical gust velocity. Next, a gain schedule 314 works in cooperation with the longitudinal control laws. The gain schedule 314 reduces a potential for rate or deflection limiting of the control surfaces. The gain schedule 314 adjusts the control surface outputs depending on the level of vertical gusts of wind as identified by the gust estimator 306. In addition, the gain schedule 314 provides control information by sending information to node 316. From node 316, the process travels to the shaping filters 318, which helps determine control signal frequency content, such as defining a signal to have a certain shape or frequency.

Shown is command limiting 320, which limits authority or operations of the VGS 110. When the VGS 110 has a low or a lowest priority for operating the aircraft 102, other functions or commands to operate the aircraft 102 may require different or separate movements of the control surfaces. For example, there may be about 30 degrees of movement available for the flaperon. If the flight operations to operate the aircraft use 20 degrees of movement, then there is only 10 degrees of movement left over for potential manipulation by the VGS 110. Next, the command limiting 320 information is sent to node 322.

Moving towards the left side of the diagram, threshold detection 324 prevents excessive low-amplitude motion of the control surfaces. The threshold detection 324 identifies whether the VGS 110 will operate or shut down. If there is not a high enough level of vertical gust, the threshold detection 324 provides a shutdown mechanism for the VGS 110. This prevents the VGS 110 operating at very low levels of vertical gust. At these levels, the benefit to decreased motion sickness and improved ride quality would be negligible, but additional wear and tear on might be caused. In this process, threshold detection 324 works cooperatively as there are valid sensor and valid signals 326 to the engage logic 328 by sending this information to node 322. Thus, the threshold detection 324 and sensor valid signals 326 act as a fail-safe mode by shutting down the VGS 110 if the inertial sensors 302 fail or the signals are invalid.

Next the process flows to command mixing 330. Command mixing 330 assures that the primary handling qualities functions of the control system will not be affected. In particular, command mixing 330 receives commands from lateral control flaperon command 332 which focuses on lateral control law for the aircraft 102. Lateral control law may include, but is not limited to, roll, twist, yaw, and the like.

The command mixing 330 receives operating information from the lateral control flaperon command 332, and from node 322. Command mixing 330 sends controls to a left flaperon 104(a) and a right flaperon 104(b). In some instances, the flaperons 104(*a*), 104(*b*) may control a roll or bank angle (degree of rotation on a longitudinal axis) of the aircraft 102. In one embodiment, the flaperons 104 on each wing are lowered together to function much the same way, in a symmetric manner. Thus, this symmetric movement by the flaperons 104 helps reduce the amount of vertical acceleration of the aircraft 102.

The process then flows to elevator gain shaping 334 where information is provided to node 336. Longitudinal elevator command 338 provides commands to the elevator to operate the aircraft 102 functions in the longitudinal manner. Both elevator gain shaping 334 and longitudinal elevator command 338 provide input to node 336. Thus, the signal from node 336 is sent to the elevator 106 to actuate pitch control surfaces. As mentioned previously, the elevator 106 may make adjustments in the vertical direction, such as pitch control of the aircraft 102 or may cancel out any additional pitching response that may be induced by the flaperons 104.

In another embodiment of the present invention, the sensing and measuring of turbulence is performed by an Ultraviolet Light Detection And Ranging (UV LIDAR) (shown as dotted block), rather than or in conjunction with the inertial sensors 302. The UV LIDAR measures an atmospheric motion ahead of the aircraft. The process with UV LIDAR offers advantages of additional control lead time.

Similar to the process in FIG. 3, the UV LIDAR proceeds to the gust estimator, the high pass filter, and the low pass filter. However, at the low pass filter, a linear phase Finite Impulse Response (FIR) filter (shown as dotted block) provides input to help shape the frequencies that are allowed to pass through and to send a command to the aircraft flight controls. This method then flows like the process of FIG. 3, starting at node 316 and leading to elevator 106. Furthermore, separate commands contribute to the aircraft controls so as to actuate direct lift control or pitch control surfaces in order to reduce a vertical acceleration, a pitch upset, a pitch acceleration, a pitch rate, a pitch attitude or a structural load of the aircraft due to the turbulence. Thus, these modifications improve safety for passengers and crew and reduce structural loads on the aircrafts.

Exemplary Computing Environment for Vertical Gust Suppression

Figure 4:
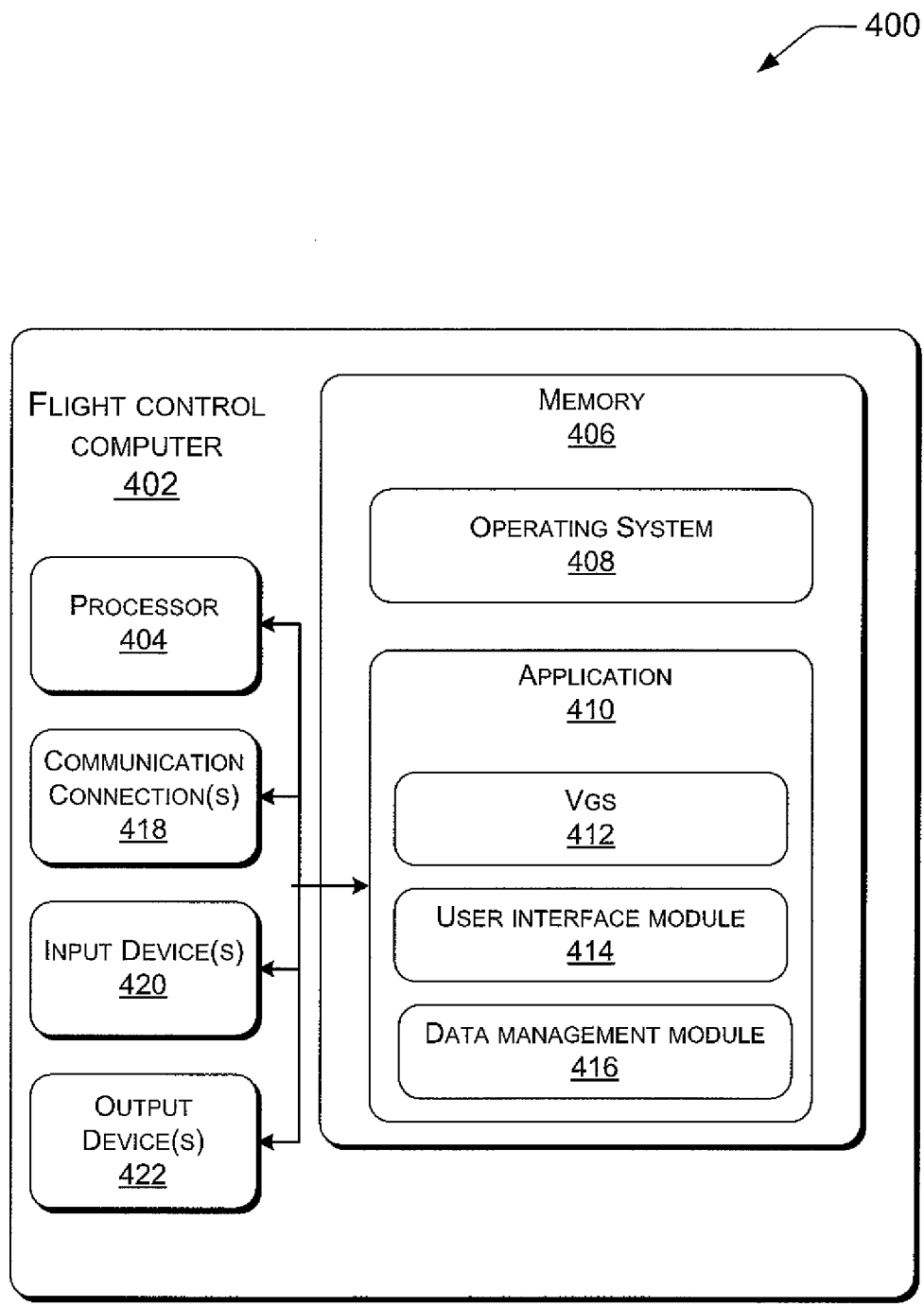
FIG. 4 illustrates a block diagram of an exemplary operating computing environment for the vertical gust suppression system of FIG. 1.

FIG. 4 is a block diagram of an exemplary general operating environment 400 for computer-readable storage media to suppress vertical gusts of wind as encountered by the aircraft 102. The environment may be configured as any suitable flight control computer 402 capable of implementing the vertical gust suppression (VGS) 110. In one exemplary configuration, the flight control computer 402 comprises at least one processor 404 and memory 406. Depending on the configuration and type of flight control computer, memory 406 may be volatile (such as RAM) and/or non-volatile (such as ROM, flash memory, etc.).

Memory 406 can store programs executed on the processor 404 and data generated during their execution. It may store any number of programs, data, including an operating system, one or more application programs, other program modules, and program data.

Memory 406 may include an operating system 408, one or more application programs 410 for implementing VGS 412, as well as various other data, programs, media, and the like. In an embodiment, the memory 406 includes the VGS 412, including a user interface module 414, and a data management module 416.

The user interface module 414 presents the user with a graphical user interface to sensing and measuring of turbulence, including an interface prompting a pilot to respond to turbulence data, such as providing input. The data management module 416 manages storage of information, such as air data 301, inertial sensor signals 302, angle of attack vane signal 304, gust estimator signal 306, high pass filter 308, low pass filter 310, and the like, and may communicate with one or more local and/or remote data bases such as forecast data or historical forecast data.

Memory 406 can also include various computer-readable storage media. It will be understood that volatile memory may include media such as random access memory (RAM), non volatile memory may include read only memory (ROM) and flash portion. The computing environment 400 may also include other removable/non-removable, volatile/non-volatile computer storage media such as a hard disk drive for reading from and writing to a non-removable, non-volatile magnetic media, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM, or other optical media. The disk drives and their associated computer-readable media can provide non-volatile storage of computer readable instructions, data, program modules, and other information for the flight control computer 402.

The flight control computer 402 may also contain communications connection(s) 418 that allow the flight control computer 402 to communicate with a database, and/or other devices on a network. Communications connection(s) 418 is an example of communication media. Communication media typically embodies computer readable instructions, data, program modules, or other information and includes any information delivery media. By way of example, and not limitation, communication media includes wired media such as a wired network or direct-wired connection, and wireless media such as acoustic, RE, infrared and other wireless media. The term computer readable media as used herein includes both storage media and communication media.

The flight control computer 402 may also include but is not limited, to input device(s) 420, such as a keyboard, a mouse, a stylus-based device, a control stick, a control yoke, and the like. The flight control computer 402 may include output devices 422, such as a display screen, speakers, and the like. All these devices are well known in the art and need not be discussed at length here.

The subject matter described above can be implemented in hardware, or software, or in a combination of both hardware and software. Although the subject matter has been described in language specific to structural features and/or methodological acts, it is to be understood that the subject matter defined in the appended claims is not necessarily limited to the specific features or acts. While specific embodiments of the invention have been illustrated and described herein, as noted above, many changes can be made without departing from the spirit and scope of the invention. Accordingly, the scope of the invention should not be limited by the disclosure of the specific embodiments set forth above. Instead, the invention should be determined entirely by reference to the claims that follow.

What is claimed is:

1. A method to suppress the effects of vertical gusts due to turbulence for an aircraft having at least one control surface actuated by aircraft controls, the method comprising:
    collecting air data and inertial data for the aircraft during flight operations;
    determining an inertial angle of attack for the aircraft and a total angle of attack for the aircraft;

determining a gust angle of attack as a difference between the inertial angle of attack and the total angle of attack;
determining a true air speed of the aircraft;
estimating a level of vertical wind gust by scaling the gust angle of attack by the true airspeed of the aircraft;
generating a command based on the estimated level of vertical wind gust when the estimated level of vertical wind gust exceeds a predetermined threshold level, wherein no command is generated responsive to the estimated level of vertical wind gust when the estimated level of vertical wind gust is below the predetermined threshold level; and
applying the command to the aircraft controls to actuate at least one control surface based on the estimated level of vertical wind gust,
wherein an aircraft response to the actuation of at least one control surface changes at least one of a vertical acceleration, a pitch acceleration, a pitch rate, a pitch attitude, or a structural load of the aircraft due to the estimated level of vertical wind gust.

2. The method of claim 1, wherein the predetermined threshold defines a minimum level of vertical wind gust corresponding to improved ride quality and decreased motion sickness.

3. The method of claim 1, further comprising adding air and inertia data to form an estimate of the estimated level of vertical wind gust.

4. The method of claim 2 wherein generating a command based on the estimated level of vertical wind gust comprises adjusting one or more control surface outputs depending on the estimated level of vertical wind gusts.

5. The method of claim 1, further comprising using an Ultraviolet Light Detection And Ranging (UV LIDAR) to measure the atmospheric motion ahead of the aircraft.

6. The method of claim 1, wherein the generating of the command comes from a set of control laws comprising at least one of a set of filters, a high pass filter, a low pass filter, or a linear phase Finite Impulse Response filter.

7. The method of claim 6, wherein the set of control laws further comprises at least one of a stability augmentation or an autopilot.

8. The method of claim 6, wherein the set of control laws are compatible with at least one of a stability augmentation or an autopilot.

9. The method of claim 6, wherein the set of control laws produce a command to negate gust effects.

10. The method of claim 1, wherein the at least one control surface comprises at least one of a flaperon or an aileron.

11. The method of claim 1, wherein the at least one control surface comprises at least one of an elevator or a canard.

12. The method of claim 1, further comprising terminating the command when a representation of at least one of least one of a sensor fails, a command fails, or an aircraft control is invalid.

13. The method of claim 1, further comprising invoking an active aircraft control to reduce the turbulence.

14. A system for Vertical Gust Suppression, the system comprising:
one or more sensors to collect air data and inertial data for the aircraft during flight operations;
a gust estimator operatively coupled to the one or more sensors to:
determine an inertial angle of attack for the aircraft and a total angle of attack for the aircraft;
determine a gust angle of attack as a difference between the inertial angle of attack and the total angle of attack;
determine a true air speed of the aircraft; and
estimate a level of vertical wind gust by scaling the gust angle of attack by the true airspeed of the aircraft;
filters operatively coupled to the gust estimator to generate a command to aircraft flight controls based on the estimated level of vertical wind gust when the estimated level of vertical wind gust exceeds a predetermined threshold level, wherein no command is generated responsive to the estimated level of vertical wind gust when the estimated level of vertical wind gust is below the predetermined threshold level; and
at least one control surface which actuates in response to the command and aircraft flight controls to change at least one of a vertical acceleration, a pitch acceleration, a pitch rate, a pitch attitude, or a structural load of the aircraft due to the vertical wind gust.

15. The system of claim 14, further comprising a true air speed module to determine a true air speed of the aircraft.

16. The system of claim 14, wherein the one or more sensors comprise an Ultraviolet Light Detection And Ranging (UV LIDAR) to measure an atmospheric motion ahead of an aircraft.

17. The system of claim 16, wherein the filters comprise at least one of a set of filters, a high pass filter, a low pass filter, or a linear phase Finite Impulse Response filter.

18. The system of claim 14, further comprising a set of control laws to generate the command, wherein the control laws comprise at least one of a stability augmentation or an autopilot.

19. The system of claim 18, wherein the set of control laws are compatible with at least one of a stability augmentation or an autopilot.

20. The system of claim 18, wherein the set of control laws produce a command to negate gust effects.

21. The system of claim 14, wherein the at least one control surface comprises at least one of a flaperon or an aileron an elevator or a canard.

22. A non-transitory computer-readable storage media including computer-program instructions executable by a flight control computer, the instructions configured to cause the flight control computer to perform operations comprising:
collecting air data and inertial data for the aircraft during flight operations;
determining an inertial angle of attack for the aircraft and a total angle of attack for the aircraft;
determining a gust angle of attack as a difference between the inertial angle of attack and the total angle of attack;
determining a true air speed of the aircraft;
estimating a level of vertical wind gust by scaling the gust angle of attack by the true airspeed of the aircraft;
generating a command based on the estimated level of vertical wind gust when the estimated level of vertical wind gust exceeds a predetermined threshold level, wherein no command is generated responsive to the estimated level of vertical wind gust when the estimated level of vertical wind gust is below the predetermined threshold level; and
wherein an aircraft response to the actuation of at least one control surface changes at least one of a vertical acceleration, a pitch acceleration, a pitch rate, a pitch attitude, or a structural load of the aircraft due to the turbulence.

23. The computer-readable storage media of claim 22, wherein the predetermined threshold defines a minimum level of vertical wind gust corresponding to improved ride quality and decreased motion sickness.

24. The computer-readable storage media of claim 22, wherein generating a command based on the estimated level of vertical wind gust comprises adjusting one or more control surface outputs depending on the estimated level of vertical wind gusts.

25. The computer-readable storage media of claim 22, further comprising terminating the command when a representation occurs of at least one of a sensor fails, a command fails, or an aircraft control is invalid.

26. The method of claim 1, wherein the at least one control surface comprises a flaperon on each wing of the aircraft and an elevator, and applying the command to the aircraft controls comprises applying the command to actuate the flaperons to modify an aircraft lift and to actuate the elevator to cancel a pitching response induced by the flaperons.

\* \* \* \* \*